United States Patent [19]

Frisquet

[11] 4,332,274
[45] Jun. 1, 1982

[54] DISCONNECTOR FOR DRINKING WATER DISTRIBUTION SYSTEM

[75] Inventor: Maurice Frisquet, Esbly, France

[73] Assignee: Anciens Establissements M. Frisquet, France

[21] Appl. No.: 206,987

[22] Filed: Nov. 14, 1980

[30] Foreign Application Priority Data

Nov. 12, 1979 [FR] France ................. 79 27779

[51] Int. Cl.³ ............................. F16K 15/02
[52] U.S. Cl. ................... 137/496; 137/218; 137/538
[58] Field of Search .......... 137/102, 107, 218, 496, 137/538, 516.25

[56] References Cited

U.S. PATENT DOCUMENTS

| | | | |
|---|---|---|---|
| 2,005,813 | 6/1935 | Thorsen | 137/538 X |
| 2,831,493 | 4/1958 | Richmond | 137/496 X |
| 2,920,645 | 1/1960 | Younghaus | 137/496 |

*Primary Examiner*—Robert G. Nilson

[57] ABSTRACT

Disconnector intended to be inserted in a drinking water distribution system so as to prevent, in the case of a pressure drop for any reason whatsoever, the water which is downstream and may be considered as polluted, from being fed-back upstream beyond the disconnector.

The passage of the water through this disconnector from upstream to downstream and the prevention of feedback of polluted water from downstream to upstream are controlled by a hollow piston closed at both its ends slidable between two end positions under the effect of the greater of the upstream or downstream pressures, whose cylindrical wall has therethrough upstream and downstream apertures, in combination with seals whose lips are applied to said cylindrical wall and which according to the position of the piston, allow the water to pass through these apertures or not.

5 Claims, 3 Drawing Figures

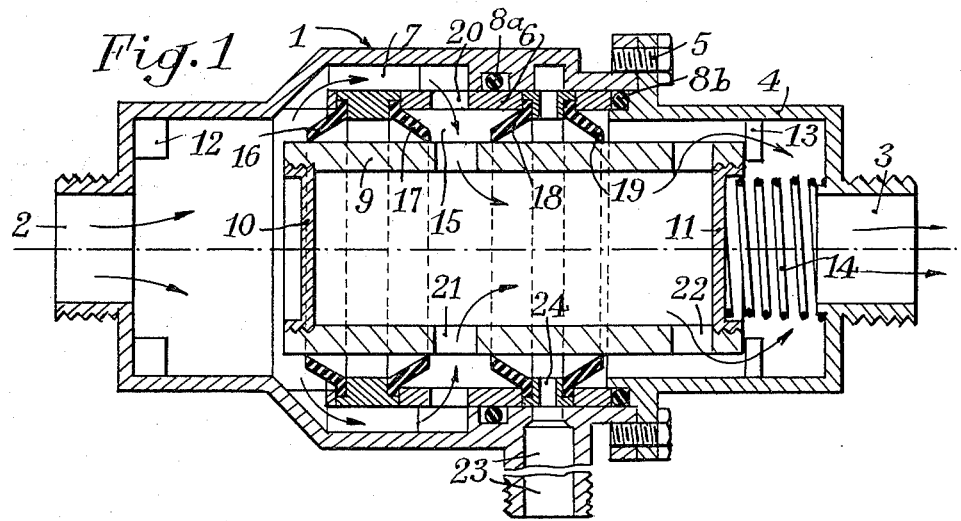
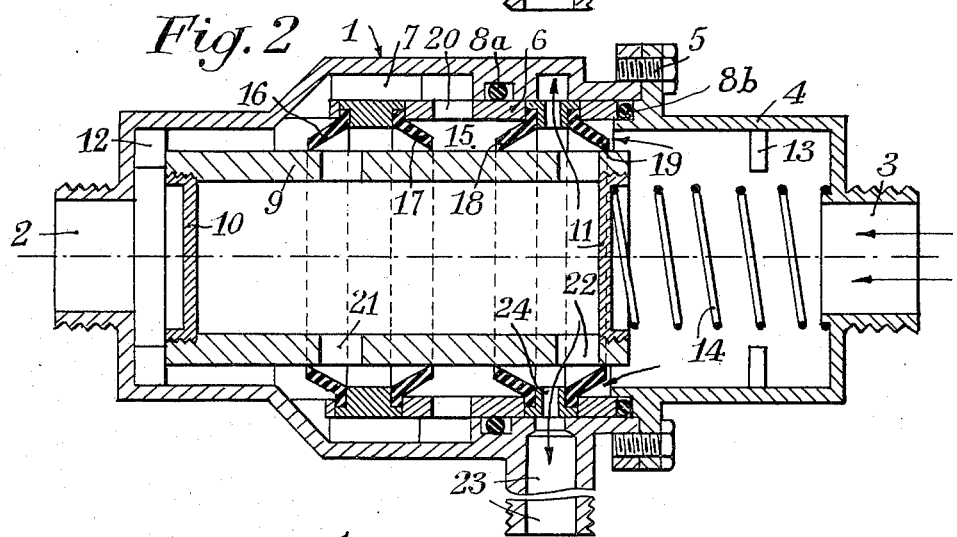
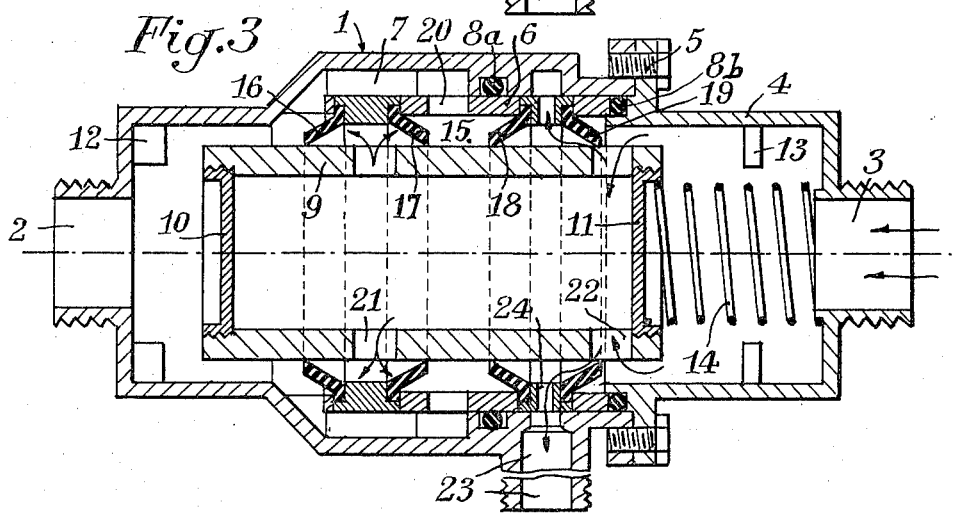

DISCONNECTOR FOR DRINKING WATER DISTRIBUTION SYSTEM

BACKGROUND OF THE INVENTION

Disconnectors are small appliances inserted in drinking water distribution systems so as to prevent, in the case of a pressure drop upstream for any reason whatsoever, the water which is downstream and may be considered as polluted from being driven back upstream beyond the disconnector.

Such appliances have already been proposed for this purpose formed from a more or less cylindrical body with coaxial inlet and outlet, a central chamber having a discharge outlet towards the drain in case of feedback and membrane and valve sealing members upstream and downstream of this central chamber, allowing free passage of the water through the body of the appliance in normal operation and stopping the arrival of water coming from upstream as well as feedback of water coming from downstream in the case of a downstream pressure greater than the upstream pressure, the leaks of polluted water fed back which may occur penetrating into the central chamber and being discharged towards the drain.

Such appliances have not always the reliability desired because of hazards due to the membranes and to the seal of the valves which is not always perfect.

SUMMARY OF THE INVENTION

To avoid this disadvantage, the disconnector of the present invention, still having a hollow cylindrical body with aligned upstream inlet and downstream outlet and a central chamber having a discharge outlet towards the drain for feedback water is characterized in that the distribution is provided by a hollow piston, closed at both its ends, sliding axially in the hollow body between two end stops, in one direction under the action of the upstream pressure and in the other under that of an antagonistic spring which is added to the downstream pressure, comprising in its cylindrical wall upstream apertures allowing the water arriving from upstream to penetrate into the hollow piston and downstream apertures allowing this water to leave the hollow piston to reach the outlet of the disconnector, in the case of normal operation, in combination with circular seals, having lips applied to the outer cylindrical surface of the hollow piston, preventing the penetration of water coming from upstream into this hollow piston, as well as that of feedback water, in the case of a downstream overpressure, while allowing leaks of feedback water to be discharged to the drain.

DESCRIPTION OF THE DRAWINGS

The accompanying drawings show by way of example one embodiment of the present invention.

FIGS. 1 and 2 are sectional views showing respectively the hollow piston in both its end positions, in the case of normal operation for one and in the case of a downstream overpressure for the other.

FIG. 3 is a similar view showing the piston in an intermediate position.

DESCRIPTION OF THE PREFERRED EMBODIMENT

The disconnector shown comprises a hollow cylindrical body 1, with an upstream inlet 2 for drinking water and a downstream outlet 3 for polluted water; the hollow body 1 has been shown in two parts, its downstream part 4 being fitted to its upstream part by means of bolts 5.

In this hollow body there is fixed an intermediate cylinder 6 leaving therebetween an annular empty space 7, open on the upstream side and closed on the downstream side, with O-seals 8a and 8b; a hollow axial piston 9, closed at its upstream 10 and downstream 11 ends, may slide between two end positions, limited respectively by an upstream stop 12 and a downstream stop 13, either from left to right of the figure in normal operation when the upstream pressure is greater than the downstream pressure, shown in FIG. 1, or in the opposite direction when the downstream pressure, assisted by that of the antagonistic spring 14, becomes greater than the upstream pressure, shown in FIG. 2.

The hollow piston 9 is separated from cylinder 6 by a free annular zone 15 in which it is held by four circular seals, fixed in auxiliary cylinder 6 and whose lips 16, 17, 18 and 19 rub against its external wall; the lips of these seals are sloped alternately upstream, downstream, again upstream and finally downstream.

The auxiliary cylinder 6 has therethrough an orifice 20 opening into the hollow space 15, defined by it, hollow piston 9 and the lipped seals 17 and 18.

Piston 9 has therethrough an upstream orifice 21 and a downstream orifice 22 which, in normal operating position, are situated respectively between seals 17 and 18, and downstream of seal 19, as shown in FIG. 1, and in the feedback position, respectively between seals 16 and 17 and between seals 18 and 19, as shown in FIG. 2.

In normal operation, when the upstream pressure is greater than the downstream pressure and when all the parts of the disconnector are in the position shown in FIG. 1, water arriving from upstream penetrates into the disconnector through its inlet 2, passes into the free space 7 between auxiliary cylinder 6 and hollow body 1, passes through orifices 20 of the auxiliary cylinder, and 21 of the hollow piston, to penetrate into this latter, from which it exits through the downstream orifice 22 thereof to arrive at the outlet 3 of the disconnector. The pressure drop is minimum.

On the other hand, in the case of feedback, the parts being then in the position shown in FIG. 2, water coming from upstream cannot penetrate into the hollow body and is isolated from downstream by seals 16, 17 and 18, and its pressure tends to apply the lips thereof against the outer wall of hollow piston 9; the polluted water fedback is blocked downstream by seal 19 whose lip it tends to apply against the external wall of hollow piston 9, and the leaks which might pass under this lip are discharged through downstream orifice 22 of hollow piston 9 towards the drain, through the discharge orifice for polluted water 23 in which it may arrive after passing through opening 24 provided for this purpose in auxiliary cylinder 6, between the two seals 18 and 19.

When hollow piston 9 is in its intermediate position, shown in FIG. 3, the upstream water is still isolated in the upstream part of the appliance, as in the case of FIG. 2, by the three lipped seals 16, 17 and 18, of which the first two prevent penetration into the hollow piston 9 through its upstream orifice 21 and the third 18 blocks its passage downstream.

On the other hand, the polluted water fedback is not yet prevented, by lipped seal 19, from penetrating through downstream orifice 22 of hollow piston 9 inside this latter but it goes directly to the discharge orifice to drain 23, passing under the lip of the lipped seal 19 and through orifice 24 of auxiliary cylinder 9.

It will be readily understood that the embodiment which has been described with reference to the accompanying drawings has been given purely by way of indication and is in no wise limiting and that numerous modifications may be made without departing from the spirit and scope of the present invention.

What is claimed is:

1. In a disconnector for a drinking water distribution system comprising a hollow cylindrical body with aligned upstream inlet and down stream outlet, a central chamber having a discharge outlet to the drain for the feedback water, and a hollow piston which the drinking water must pass through to go from the inlet to the outlet of the hollow body, said piston being axially slidable in the hollow body, between two end stops, in one direction under the action of the upstream pressure of the drinking water and in the other under that of an antagonistic spring which is added to the downstream pressure of feedback water, said hollow piston is closed at both its ends and it comprises in its cylindrical wall upstream apertures allowing the drinking water arriving from upstream to penetrate into the hollow piston and downstream apertures allowing this water to leave the hollow piston to reach the outlet of the disconnector, in the case of normal operation, in combination with circular lipped seals applied to the external cylindrical surface of the hollow piston, preventing the penetration of drinking water coming from upstream into said hollow piston, as well as that of the feedback water coming from downstream in the case of a downstream overpressure, while allowing leaks of feedback water to be discharged to the drain.

2. The disconnector as claimed in claim 1, wherein there is fixed in said hollow body an intermediate cylinder leaving therebetween an annular empty space, open on the upstream side and closed on the downstream side.

3. The disconnector as claimed in claim 2, wherein the hollow piston is separated from the cylinder by a free annular zone, in which it is held by four circular seals, fixed in the intermediate cylinder and whose lips rub against its outer wall.

4. The disconnector as claimed in claim 3, wherein the lips of the seals are inclined alternately upstream, downstream, again upstream and finally downstream.

5. The disconnector as claimed in claim 3 or in claim 4, wherein the intermediate cylinder has therethrough an orifice opening into said free annular zone, and said upstream apertures and downstream apertures of said piston, in normal operation, are situated respectively between a first and a second of said seals and downstream of a third of said seals, and, in the case of a downstream overpressure, respectively between a fourth of said seals and said first seal and between said second and third seals.

* * * * *